United States Patent [19]

Miller et al.

[11] Patent Number: 4,622,307

[45] Date of Patent: Nov. 11, 1986

[54] LOW SHRINKAGE KAOLIN REFRACTORY FIBER AND METHOD FOR MAKING SAME

[75] Inventors: William C. Miller, Littleton; Leonard E. Olds, Castle Rock, both of Colo.

[73] Assignee: Manville Corporation, Denver, Colo.

[21] Appl. No.: 738,820

[22] Filed: May 29, 1985

[51] Int. Cl.$^4$ ............................................. C03C 13/02
[52] U.S. Cl. ...................................... 501/38; 501/27; 501/107
[58] Field of Search ................................... 501/35–36, 501/38, 95, 106, 107

[56] References Cited

U.S. PATENT DOCUMENTS

| | | | |
|---|---|---|---|
| 2,873,197 | 2/1959 | McMullen | 501/35 |
| 4,147,911 | 4/1979 | Nishitani | 501/106 |
| 4,240,833 | 12/1980 | Myles | 501/4 |
| 4,251,279 | 2/1981 | Ekdahl | 501/35 |
| 4,304,604 | 12/1981 | Daerr et al. | 501/38 |
| 4,379,111 | 4/1983 | Smith et al. | 264/137 |

FOREIGN PATENT DOCUMENTS

| | | | |
|---|---|---|---|
| 149927 | 11/1950 | Australia | 501/107 |
| 55-158151 | 12/1980 | Japan | 501/38 |

*Primary Examiner*—Helen M. McCarthy
*Attorney, Agent, or Firm*—John D. Lister; Cornelius P. Quinn; Timothy R. Schulte

[57] ABSTRACT

A refractory fiber composition and method for making refractory fiber from the composition. The refractory fiber composition includes kaolin clay as a source of alumina and silica to which is added zircon.

3 Claims, No Drawings

LOW SHRINKAGE KAOLIN REFRACTORY FIBER AND METHOD FOR MAKING SAME

FIELD OF THE INVENTION

The invention relates to the field of refractory fibers. More particularly, the invention relates to the field of refractory fibers which exhibit low shrinkage upon exposure to high temperature. In still greater particularity the invention relates to fibers containing alumina and silica. By way of further characterization but not by way of limitations thereto the invention is a fiber which includes kaolin clay as a source of alumina and silica to which is added zircon.

BACKGROUND OF THE INVENTION

As used herein, refractory fibers are defined as inorganic, amorphous, or crystalline fibers which are not adversely affected by temperatures in excess of 1500° F. A typical refractory fiber is a glassy fiber melted from equal amounts of pure oxides of $Al_2O_3$ and $SiO_2$. The melt is fiberized by techniques which are well known in the art. This typical fiber is heated at 2300° F.–2400° F. and exhibits shrinkage of 3–4% in 24 hrs. exposure at these temperatures.

Another class of fibers is made by melting kaolin clay. A good discussion of such fiber is found in *Inorganic Fibers*, by C. Z. Carroll-Porczynski, published in 1958 by Academic Press Publishers in New York. At pages 162–164 of this reference a Kaowool ® fiber is disclosed as being marketed by Babcock and Wilcox. Due to impurities of the commercial grade kaolin used, this fiber exhibits linear shrinkage of 5–8% at 2300° F.–2400° F. In addition kaolin fibers generally contain a high percentage of shot which is nonfiberized material. Shot may deleteriously affect the thermal insulating properties of the refractory fiber. The greatest advantage of kaolin based fiber is that the cost of kaolin is very low compared to the pure oxides utilized in melting the fiber discussed below.

It has been disclosed that the addition of zirconia to pure oxides of alumina and silica will improve the melt rate and fiberization of refractory fibers. U.S. Pat. No. 2,873,197 issued to J. C. McMullen on Feb. 10, 1959 contains such disclosure. While improving the fiber yields and process, the addition of zirconia does not allow fiber to be made as easily as kaolin based fibers.

A previous application of which the present inventors were aware, discloses a fiber made by melting pure oxides of $Al_2O_3$, $SiO_2$ and $ZrO_2$. As with the fibers disclosed in McMullen, these fibers melt more rapidly than pure alumina-silica fibers. However, Applicants disclose therein that unexpectedly low linear shrinkage was found for fibers melted in a very narrow combination percentages of pure alumina-silica-zirconia. In another range, it was found that the addition of zirconia imparted acid and alkaline resistance to the fibers. The disadvantage of fibers made from the disclosed pure oxides is that the fiber is made from a three component system utilizing expensive oxides rather than a two component system used to make alumina-silica fibers.

SUMMARY OF THE INVENTION

The present invention combined kaolin clay and zircon to produce a fiber which has a better melt rate than alumina-silica compositions, has lower linear shrinkage than kaolin based fibers, and is less expensive than alumina-silica-zirconia fibers made from pure oxides.

The present invention utilizes a kaolin-zircon mix of, by weight percent, 59–96% kaolin and 4–41% zircon.

DESCRIPTION OF THE PREFERRED EMBODIMENT

In order to evaluate kaolin-zirconia fibers, a variety of these fibers made from varying percentages of kaolin and zircon were produced. Desired compositional formulations were identified, and the components were added in the desired proportions to a three foot diameter, 19 inch deep research melter. The compositions were melted electrically with the melt stream exiting through an orifice and impinging on a pair of rotating spinners. This produces fibers which are generally 2–7 microns in diameter, ½ to 10 inches in length (2–3 inch average), and having a varying shot content (35–45%, usually). The fibers were collected and analyzed to substantiate composition and samples of these various fibers were made and subjected to shrinkage testing. To produce these fibers a kaolin clay having the following chemical composition in percent by weight was used:

TABLE 1

| Component | Percent |
| --- | --- |
| $SiO_2$ | 52.1 |
| $Al_2O_3$ | 44.4 |
| $ZrO_2$ | 0.23 |
| $TiO_2$ | 1.76 |
| $Fe_2O_3$ | 0.79 |
| $Na_2O$ | 0.05 |
| $K_2O$ | 0.06 |
| $CaO$ | 0.12 |
| $MgO$ | 0.07 |

Kaolin clay is a member of the family of naturally occurring essentially alkali free (less than 0.5%) clays characterized as 1:1 dioctahedral phyllosilicates of the general composition $Al_2Si_2O_5(OH)_4$. Other members of this family of clays are dickite, nacrite, and halloysite. While any of these clays may be substituted for kaolin, the availability and lower cost of kaolin made it the preferred component. It is also possible to utilize a combination of pyrophyllite and zircon to produce an acceptable fiber. Pyrophyllite is an essentially alkali free (less than 0.5%) clay characterized by the description 2:1 dioctahedral phyllosilicates of the composition $Al_2Si_4O_{10}(OH)$.

As stated above, a kaolin-zircon mixture is preferred to produce fiber under the teachings of the invention. Becuase it is a 2 component system rather than a 3 component system such as pure oxie of silica, alumina, and zirconia, a kaolin-zircon system requires less equipment and less metering to control the mixing percentages. As stated above, while the combination of any of the above clays, with zircon achieve this advantage, kaolin is most preferred due to its lower cost.

The amount of components lost on ignition (LOI) was 0.09%. The first fiber (A) was produced using the above described kaolin only. Subsequent fibers were produced using varying amounts of zircon as shown below in Table 2.

TABLE 2

| Fiber | Kaolin (weight) | Zircon (weight) |
| --- | --- | --- |
| A | 100% | 0% |
| B | 96% | 4% |
| C | 86% | 14% |
| D | 82% | 18% |
| E | 77% | 23% |
| F | 69% | 31% |

TABLE 2-continued

| Fiber | Kaolin (weight) | Zircon (weight) |
|---|---|---|
| G | 63% | 37% |
| H | 59% | 41% |
| I | 48% | 52% |
| J | 42% | 58% |

As a result of these mixtures, fibers were produced having the following percentages of silica, alumina and zirconia:

TABLE 3

| Fiber | Silica (wt) | Alumina (wt %) | Zirconia (wt %) | LOI |
|---|---|---|---|---|
| A | 52.1 | 44.4 | 0.23 | 0.09 |
| B | 52.0 | 42.2 | 2.93 | 0.09 |
| C | 49.8 | 38.3 | 9.32 | 0.10 |
| D | 48.6 | 36.2 | 12.3 | 0.07 |
| E | 47.8 | 34.4 | 15.1 | 0.07 |
| F | 46.2 | 31.0 | 20.7 | 0.09 |
| G | 44.8 | 27.7 | 25.0 | 0.24 |
| H | 44.4 | 26.4 | 27.2 | 0.07 |
| I | 42.6 | 22.5 | 34.7 | 0.01 |
| J | 41.6 | 19.4 | 38.6 | — |

The loss on ignition (LOI) for all samples was done at 1000° C. The minor constituents of sample A were determined on an ICP. The major compounds in sample A including $ZrO_2$ were done on an XRF spectrometer.

The three major constituents in the remaining nine samples were determined using the XRF spectrometer. All XRF work was performed on 1:10 sample to lithium tetraborate fusions. In order to calculate the higher concentrations of $ZrO_2$ a series of synthetic standards was prepared using BSC 388 (zircon sand), NBS 77 (refractory), and pure $SiO_2$. These standards were also made into fusions. The calculated values for the major components are listed below.

| Standard | $SiO_2$ | $Al_2O_3$ | $ZrO_2$ |
|---|---|---|---|
| A | 35.98 | 20.99 | 39.70 |
| B | 39.30 | 26.88 | 29.82 |
| C | 42.62 | 32.78 | 19.91 |
| D | 42.58 | 41.63 | 9.99 |

The XRF intensities and the calculated concentrations were used to develop a least squares regression for each component. This regression was then used to determine the concentrations of $SiO_2$, $Al_2O_3$, and $ZrO_2$ is samples B through J. The component showing the greatest amount of relative error was $ZrO_2$. The error value for $ZrO_2$ is + or − 1.2%.

Once the fibers were produced a comparative test was made to determine linear shrinkage for each test fiber A–H. Fibers I and J were not tested since the fibers produced were not considered of adequate interest in that it was difficult to fiberize these sample melts. The experimental fibers were prepared by needling and annealing mat from the fiber run into a 10 mm thick blanket. To make the mat portion of fiber was compressed between two bricks and heated to 650° C. for approximately 20 minutes. This gave an annealed piece of mat from which shrinkage samples could be cut. In all cases, the needled, annealed blankets exhibited good tensile strength after needling and annealing.

To test comparative linear shrinkage, fibers A–H, a pure oxide fiber, and three commercially available kaolin fibers—Kaowool 2300, Cer-Wool 2300, and Durablanket were tested. One sample of each material was randomly positioned in a research kiln and fired for 4, 24 and 48 hours. This process was repeated at the same temperature with a second set of samples from each material again randomly placed in the furnace at that temperature. The data on linear shrinkage presented in Table 4 represents the average value for the two tests of each material at each temperature.

TABLE 4

| Fiber | 2300° F. % Shrink. | | | 2400° F. % Shrink. | | | 2500° F. % Shrink. | | | 2600° F. % Shrink. |
|---|---|---|---|---|---|---|---|---|---|---|
|  | 4 hr | 24 hr | 48 hr | 4 hr | 24 hr | 48 hr | 4 hr | 24 hr | 48 hr | 24 hr |
| (A) | 3.6 | 4.1 | 4.1 | 5.3 | 5.3 | 5.3 | 9.1 | 9.3 | 9.5 | 12.9 |
| (B) | 4.7 | 5.6 | 5.7 | 5.4 | 5.7 | 5.7 | 11.4 | 11.5 | 11.6 | 16.5 |
| (C) | 2.8 | 3.5 | 3.5 | 3.8 | 3.9 | 3.9 | 6.1 | 6.2 | 6.3 | 14.1 |
| (D) | 2.5 | 3.1 | 3.2 | 3.4 | 3.4 | 3.4 | 5.9 | 6.1 | 6.3 | 12.0 |
| (E) | 1.6 | 2.1 | 2.2 | 2.4 | 2.5 | 2.5 | 4.7 | 4.8 | 4.9 | 10.7 |
| (F) | 2.4 | 2.7 | 2.7 | 2.6 | 2.6 | 2.6 | 4.8 | 4.9 | 4.9 | 8.9 |
| (G) | 2.2 | 2.7 | 2.7 | 4.0 | 4.1 | 4.0 | 10.5 | 10.5 | 10.5 | 16.7 |
| (H) | 3.6 | 4.3 | 4.3 | 6.1 | 6.2 | 6.2 | 13.6 | 13.6 | 13.9 | 21.3 |
| Commercially Available Alumina-Silica Fibers | | | | | | | | | | |
| KAOWOOL* | 6.3 | 6.7 | 6.9 | 7.9 | 7.9 | 8.0 | 13.7 | 14.7 | 15.2 | 21.0 |
| DURABLANKET* | 5.2 | 5.7 | 5.8 | 6.7 | 6.7 | 6.7 | 10.1 | 10.8 | 11.0 | 14.1 |
| CER-WOOL* | 5.1 | 5.6 | 5.7 | 6.4 | 6.7 | 6.8 | 9.7 | 10.3 | 10.3 | 15.7 |
| CERABLANKET* | 2.5 | 3.0 | 3.2 | 3.1 | 4.1 | 4.4 | 4.6 | 5.7 | 5.7 | 6.9 |

Commercially available kaolin based blankets
KAOWOOL is a trademark of Babcock and Wilcox
DURABLANKET is a trademark of Carborundum Co.
CER-WOOL is a trademark of C.E. Refractories.
*CERABLANKET is a trademark of Manville Corporation and is an alumina-silica fiber made from pure oxides rather than kaolin.

The shrinkage data from Table 4 suggests that composition E and F exhibit the best overall shrinkage results as compared with any of the test fibers on the commercially available fibers. In general, shrinkage of less than 5% is considered excellent while shrinkage of 5–8% is considered moderate with 8% being marginally acceptable. Shrinkage in excess of 8% is considered unacceptable. Thus all of the commercially available kaolin fibers are moderately acceptable at 2300° F. and 2400° F. but unacceptable at 2500° F. Fibers C–G were in the excellent category at 2400° F. Fibers E and F were in the excellent category at 2500° F. while fibers C and D were in the acceptable range at 2500° F. Finally, fiber F performed much better than any available kaolin fiber or other test fiber even at 2600° F. Only the pure oxide fiber performed better at 2600° F. These results show that a kaolin fiber with up to 28% zirconia outperforms conventional kaolin fibers. Because the kaolin fibers are easier to fiberize and less costly than pure oxide fibers, the addition of zircon to kaolin to reduce shrinkage at elevated temperatures is a novel way to provide a low cost, low shrinkage kaolin based fiber.

While the invention has been disclosed with respect to a peferred embodiment thereof, it is not to be so limited as changes and modifications may be made which are within the full intended scope of the invention as defined by the appended claims. For example, while kaolin is a preferred clay, any of the the alumina-silica clays disclosed could be utilized without departing from the full intended scope of the invention.

We claim:

1. A refractory glass fiber of the composition in percent by weight 44–52% silica, 26–43% alumina, and 3–27% zirconia, said fiber having shrinkage of less than about 6% when subjected to a temperature of about 2400° F. for about four hours. Wherein said refractory fiber is produced from a two component composition consisting of in percent by weight: 59–96% of a clay selected from the group generally designated as 1:1 dioctahedral phyllosilicates of the composition $Al_2Si_2O_5(OH)_4$ and 4–41% zircon.

2. Fiber according to claim 1 wherein said clay is kaolin clay.

3. A refractory glass fiber of the composition in percent by weight 44–52% silica, 26–43% alumina, and 3–27% zirconia said fiber having shrinkage of less than about 6% when subjected to a temperature of about 2400° F. for about four hours, wherein said refractory fiber is produced from a two component composition consisting of in percent by weight: 59–96% pyrophyllite and 4–41% zircon.

* * * * *